United States Patent [19]

Sawyer

[11] Patent Number: 5,424,493

[45] Date of Patent: * Jun. 13, 1995

[54] FORCE RESOLVING SYSTEM AND METHOD

[75] Inventor: Bruce A. Sawyer, Santa Rosa, Calif.

[73] Assignee: Xenetek Corporation, Rohnert Park, Calif.

[*] Notice: The portion of the term of this patent subsequent to Nov. 17, 2009 has been disclaimed.

[21] Appl. No.: 880,837

[22] Filed: May 11, 1992

Related U.S. Application Data

[63] Continuation-in-part of Ser. No. 452,732, Dec. 19, 1989.

[51] Int. Cl.$^6$ .................. G08C 21/00; G06K 9/00
[52] U.S. Cl. ..................... 178/18; 382/119; 382/187
[58] Field of Search ............ 382/3, 13, 59; 198/18, 198/19, 20

[56] References Cited

U.S. PATENT DOCUMENTS

| | | | |
|---|---|---|---|
| 3,692,413 | 9/1972 | Marcy et al. | 356/106 |
| 4,143,357 | 3/1979 | Baver et al. | 340/146.3 |
| 4,475,235 | 10/1984 | Graham | 382/3 |
| 4,951,036 | 8/1990 | Grueter et al. | 178/18 X |
| 5,165,102 | 11/1992 | Sawyer | 382/13 |

FOREIGN PATENT DOCUMENTS 1152218 8/1983 Canada.

Primary Examiner—Stephen Chin
Assistant Examiner—Kevin Kim
Attorney, Agent, or Firm—Flehr, Hohbach, Test, Albritton & Herbert

[57] ABSTRACT

Force resolving system and method which are particularly suitable for use in the analysis of handwriting and the verification of signatures. A platen is coupled to a plurality of force transducers in such manner that only forces acting along mutually perpendicular axes are applied to the transducers. In one disclosed embodiment, each of the transducers has a film of piezoelectric material and a pressure plate which bears against the film, and forces are applied to the transducers by balls in rolling engagement with the pressure plates. In another disclosed embodiment, the forces are applied to the transducers by flexure elements connected between the platen and the pressure plates. The balls and flexure elements transfer forces acting in a directions perpendicular to the film and permit relative movement of the platen and the transducers in directions parallel to the film.

17 Claims, 5 Drawing Sheets

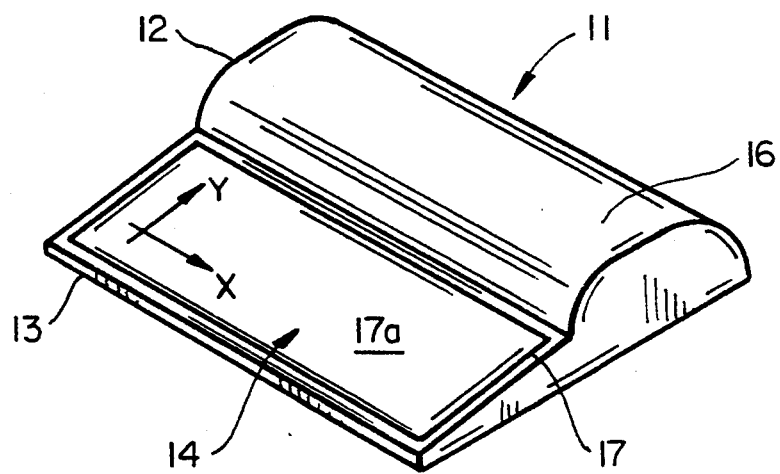
FIG_1
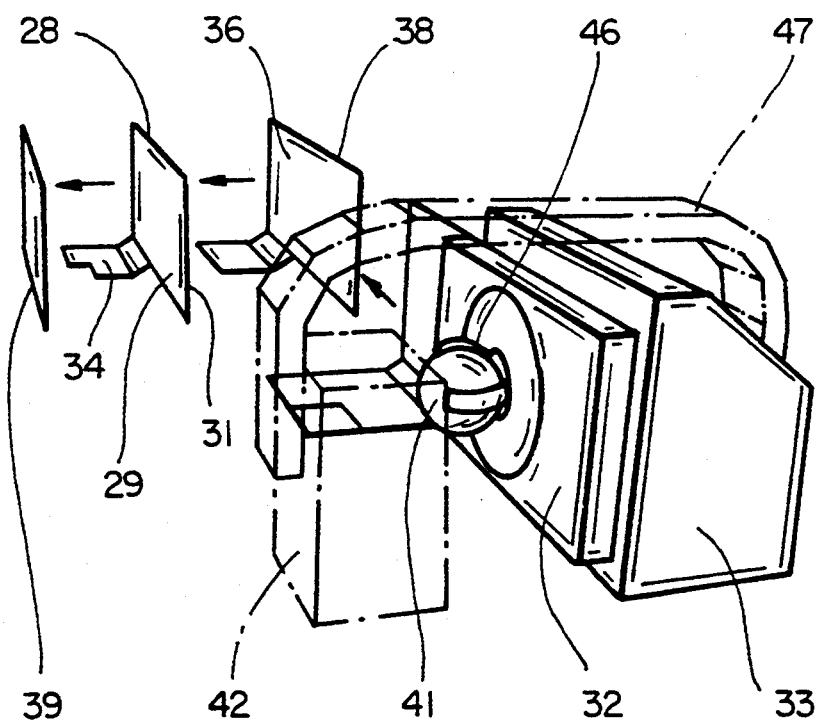
FIG_3

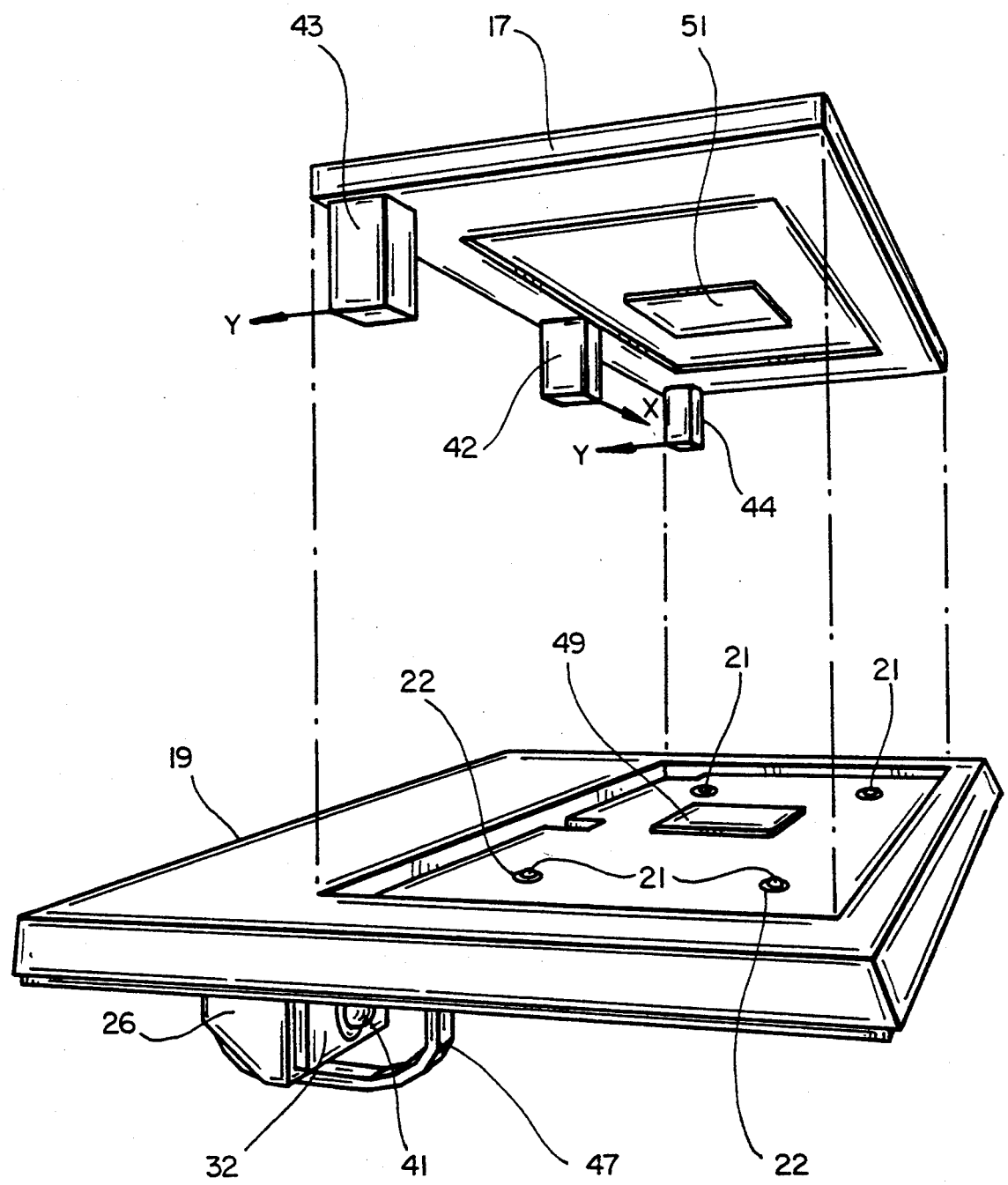
FIG_2

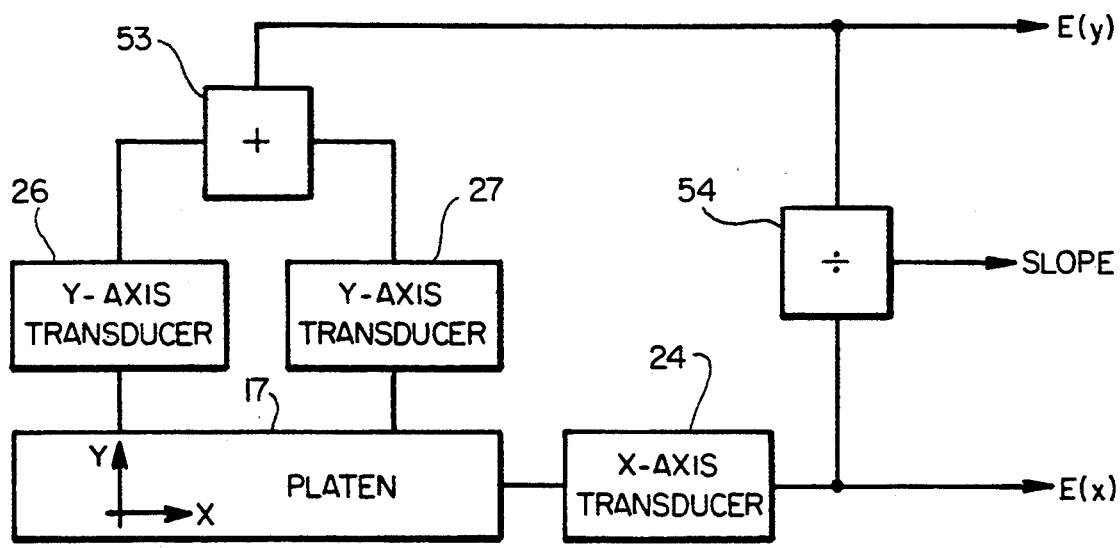
FIG_4
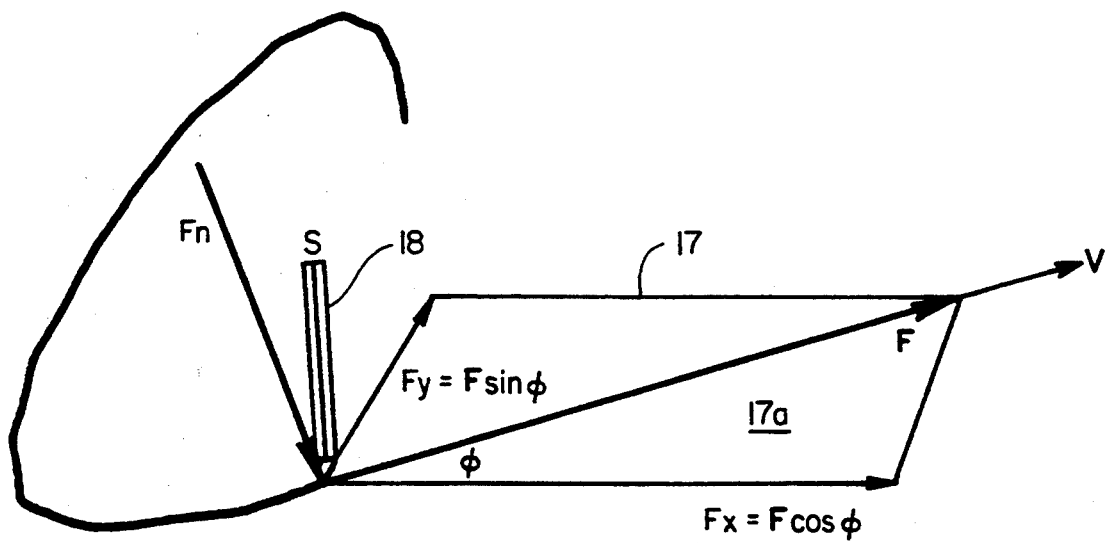
FIG_5

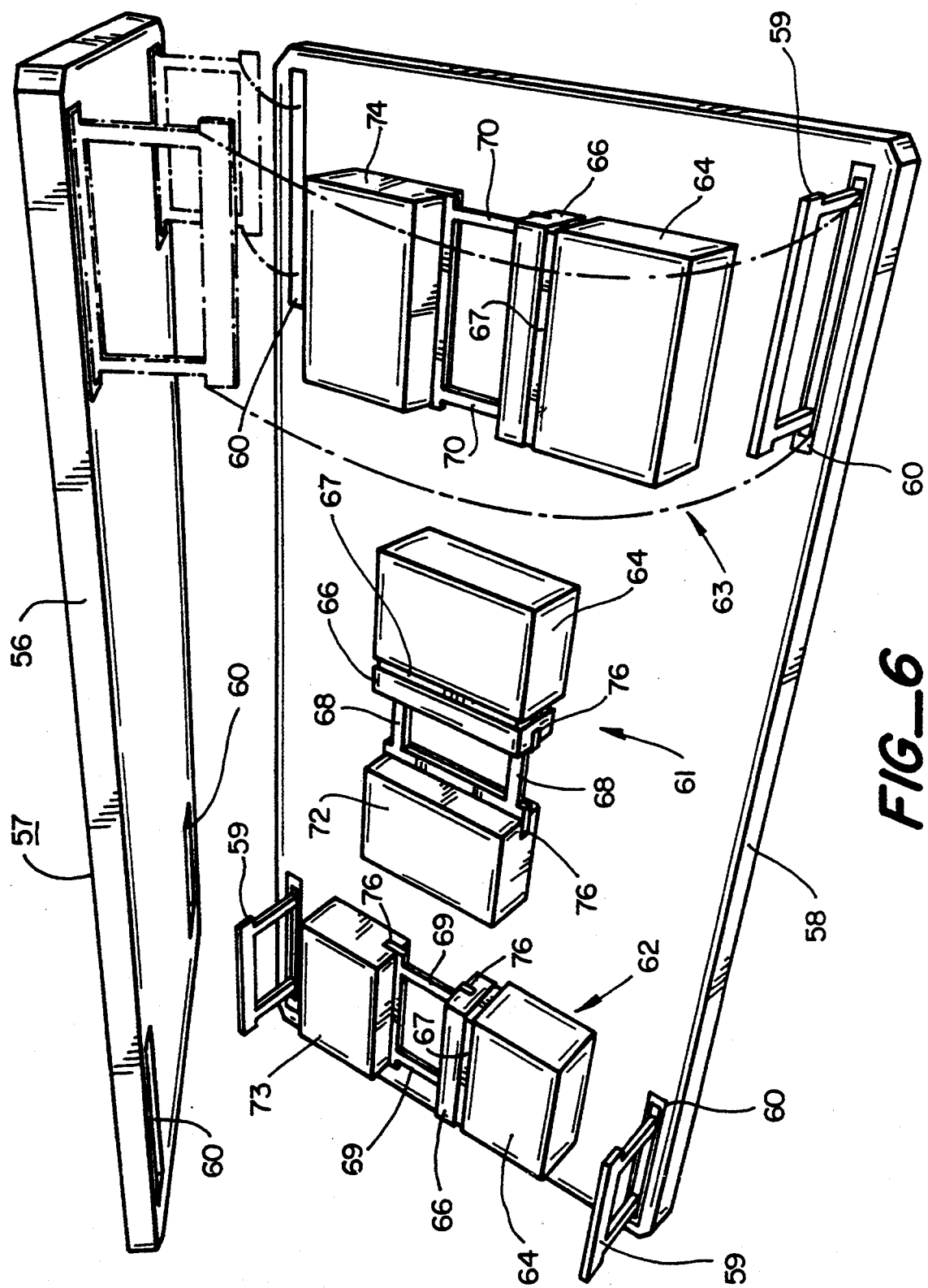

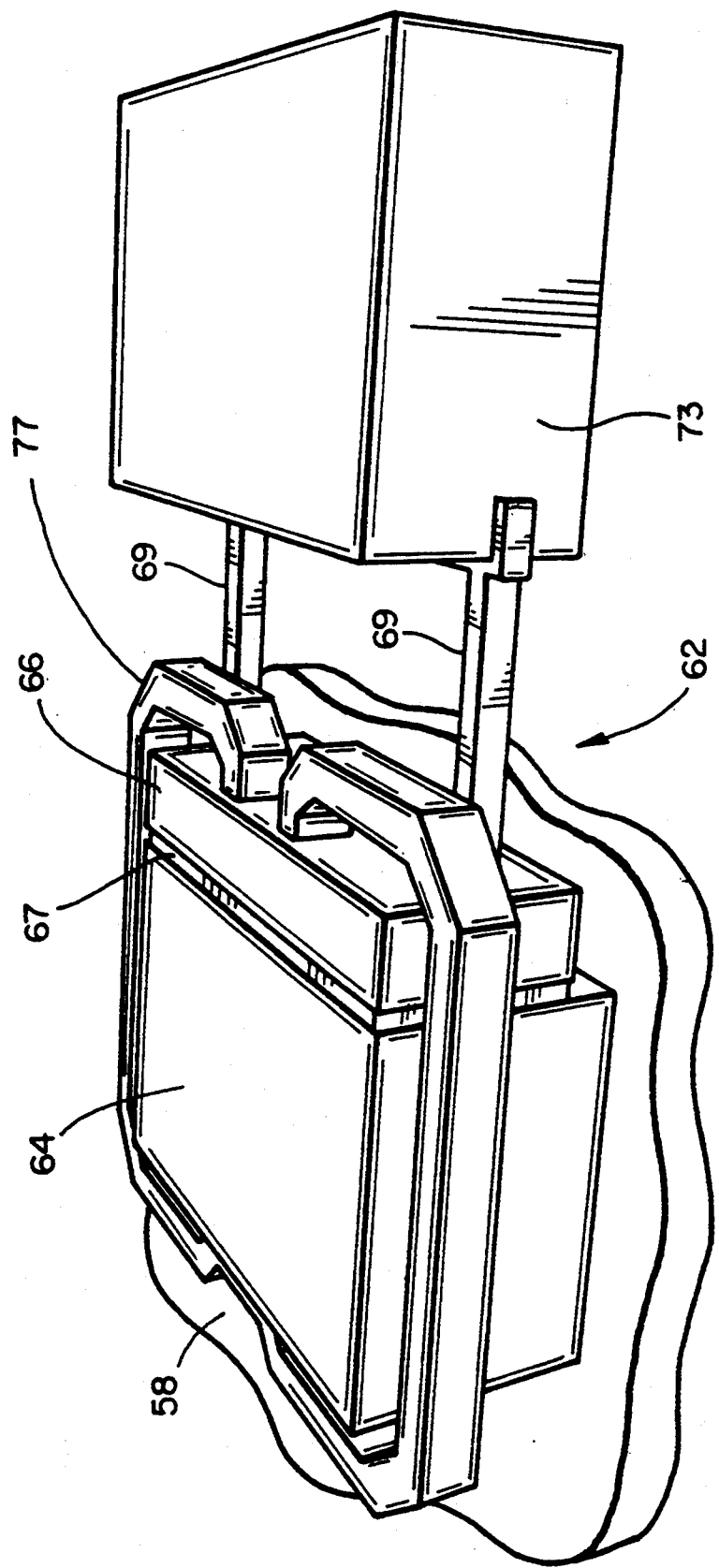
FIG_7

FORCE RESOLVING SYSTEM AND METHOD

This is a continuation-in-part of Ser. No. 07/452,732, filed Dec. 19, 1989.

This invention pertains generally to the transducing and resolution of forces and, more particularly, to a force resolving system and method which are particularly suitable for use in the analysis of handwriting and the verification of signatures.

Handwritten signatures have long been employed as a means of personal identification. They are used, for example, on checks, in making credit card charges, and in numerous other situations in which identification is required.

The traditional method of signature verification is visual comparison of a newly written signature with a previously recorded signature. This comparison is often made by relatively untrained personnel who do not have the expertise required to distinguish an authentic signature from a forgery.

In recent years, techniques have been developed for analyzing handwriting and verifying signatures with the aid of computers. In such systems, digitized representations of sample signatures are stored in memory, and representations of new signatures are obtained and compared with the stored samples by suitable algorithms.

Heretofore, two basic approaches have been taken in obtaining representations of signatures for use in computer processing. In one approach, the signatures are scanned optically after they are written, and in the other, motions made or forces generated while writing are converted into electrical signals by transducers mounted on the writing implement and/or writing surface. The first approach has not been as widely implemented as the second because optical scanning devices are often bulky, expensive and generally not well suited for real-time applications of signature verification.

Examples of force sensitive pens with transducers for use in signature verification are found in U.S. Pat. Nos. 3,145,367, 3,906,444, and 4,646,351.

One example of a system for monitoring the forces exerted on a writing surface is found in U.S. Pat. No. 3,988,934. In this system, the paper on which a signature is to be written is placed on a platen which is supported by beams with strain gauges for monitoring forces exerted on the platen by a writing instrument.

It is in general an object of the invention to provide a new and improved system and method for monitoring and resolving forces acting on a platen.

Another object of the invention is to provide a system and method of the above character which are particularly suitable for use in handwriting analysis and signature verification.

These and other objects are achieved in accordance with the invention by coupling a platen to a plurality of force transducers in such manner that only forces acting along mutually perpendicular axes are applied to the transducers. In one disclosed embodiment, each of the transducers has a film of piezoelectric material and a pressure plate which bears against the film, and forces are applied to the transducers by balls in rolling engagement with the pressure plates. In another disclosed embodiment, the forces are applied to the transducers by flexure elements connected between the platen and the pressure plates. The balls and flexure elements transfer forces acting in a directions perpendicular to the film and permit relative movement of the platen and the transducers in directions parallel to the film.

FIG. 1 is an isometric view of one embodiment of a signature verification system according to the invention.

FIG. 2 is an exploded perspective view of one embodiment of a force resolving system for use in the embodiment of FIG. 1.

FIG. 3 is an enlarged exploded perspective view of a portion of the system of FIG. 2.

FIG. 4 is a simplified block diagram of a portion of the force resolving system in the embodiment of FIG. 2.

FIG. 5 illustrates the manner in which forces are applied to the platen by a stylus in the embodiment of FIG. 1.

FIG. 6 is an exploded perspective view of another embodiment of a force resolving system for use in a signature verification system incorporating the invention.

FIG. 7 is a fragmentary perspective view illustrating the application of a preloading clamp to one of the transducers in the embodiment of FIG. 6.

In FIG. 1, the invention is illustrated in the form of a portable instrument 11 for handwriting analysis or signature verification. This instrument has a generally rectangular case or housing 12 with a sloping front portion 13. A force resolving system 14 is mounted in the front portion of the housing, and circuitry for processing signals from the force transducers is enclosed within the rear portion 16 of the housing. If desired, this circuitry can include a modem for communication with other processing systems.

The force resolving system includes a generally rectangular platen 17 which has a planar upper surface 17a on which signatures and other handwriting to be analyzed are written. The writing can be done directly on the platen with a stylus or other suitable implement, or it can be done on a sheet of paper or other material placed on the platen. During the writing process, the forces exerted on the stylus or pen are applied to the platen.

The manner in which the forces are applied to the platen is illustrated in FIG. 5. In this figure, the letter "C" is being written on the platen with a stylus 18. The stylus acting on the platen imparts a normal force $F_n$ in a direction perpendicular to the surface of the platen and a coplanar force F in a direction parallel to the surface of the platen. The tip of the stylus moves over the surface of the platen with a velocity V. The coplanar drag force is substantially independent of the magnitude of the velocity, but the direction of the coplanar drag force is substantially parallel to the direction of the velocity. The relationship between the coplanar force F, the normal force $F_n$ and the velocity of the stylus V can be expressed as follows:

$$F = \mu F_n V / |V|,$$

where $\mu$ is the coefficient of friction and $|V|$ is the magnitude of the velocity. The slope of the velocity vector with respect to the x and y coordinate axes can be determined by measuring the x and y components $(F_x, F_y)$ of the coplanar force F, and dividing the y-component by the x-component. The slope or the angle associated with the slope is used in a signature verification algorithm.

The platen is mounted on a base 19 for movement in a plane parallel to the writing surface 17a. This plane is conveniently referred to as the x-y plane, with the x-axis parallel to the upper and lower edges of the writing surface, the y-axis parallel to the side edges of the writing surface, and a z-axis perpendicular to the plane of the writing surface. In the embodiment illustrated, the lower surface of the platen rests upon a plurality of balls 21 mounted in sockets 22 on the base. The platen is in rolling engagement with the balls, and the balls have limited freedom to rotate in their sockets, whereby the platen is free to move in any direction in the x-y plane but is rigidly supported in the z-direction. The balls are flexibly retained or caged to provide an accurate nominal location.

Means is provided for monitoring the forces applied to the platen and resolving these forces into components in the x and y directions. In the embodiment illustrated, this means includes a first transducer 24 to which the x-components are applied and a pair of transducers 26, 27 to which the y-components are applied. The outputs of the two y-component transducers are combined in a manner discussed more fully hereinafter to provide a single y-component signal. The use of one transducer for the x-components and two for the y-components assures a uniform output regardless of where the writing occurs on the rectangular writing surface of the platen illustrated. With a platen having a different aspect ratio, a different arrangement of transducers can be employed. For example, with a square writing surface, two transducers could be employed for the x-axis and a single transducer for the y-axis.

Each of the transducers has a film of piezoelectric material 28 with metallized electrodes 29, 31 on the front and rear surfaces thereof. The film is positioned between a pressure plate 32 and a stationary block 33, and a varying electrical signal is developed between the electrodes in accordance with the varying force exerted upon the film by the pressure plate. Electrical connections with the electrodes are made by a metallized lead 34 which is connected directly to the electrode 29 on the front side of the film and by a metallized conductor 36 which contacts the electrode 31 on the other side of the film. Conductor 36 is a metallized coating on an insulative film 38 which is positioned between the rear side of the piezoelectric film and the block 33, and an insulative film 39 is positioned between the pressure plate and the front side of the piezoelectric film. Each of the blocks 33 is mounted in a fixed position on the base 19, and in one presently preferred embodiment, the blocks are cast as an integral part of the base.

Means is provided for coupling the platen to the transducers with a high mechanical impedance along the axes of the transducers, i.e. perpendicular to the piezoelectric film and the pressure plates, and a low mechanical impedance in other directions. This provides a coupling which is stiff in the axial direction and compliant in the other directions. Although the movement in the other directions is of very small magnitude, i.e. on the order of microinches, the compliancy or decoupling in these directions is very important to the accurate functioning of the device.

In the embodiment illustrated, the platen is coupled to each of the transducers by a ball 41 in rolling engagement between the platen and the pressure plate. In this regard, the platen has a plurality of depending blocks or bosses 42–44, and the balls are positioned between the bosses and the pressure plates of the respective transducers. The balls are flexibly retained by cages 46 affixed to the pressure plates, with the balls in rolling engagement between the bosses and the plates. U-shaped spring clips 47 engage the bosses and the blocks and urge the bosses toward the blocks to preload the transducers with a suitable predetermined force.

The net force applied to each transducer is the sum of the preload force and the x or y-component of the force applied to the platen by the stylus or other writing implement. Thus, the force applied to the transducer will increase or decrease depending on the direction of the force applied to the platen. The change in the force applied to the transducer force is sensed by the piezoelectric film to provide a signal corresponding to the change. If the net force increases, the signal is positive, and if the force decreases, the signal is negative.

In some applications, it may be desirable to eliminate pressure plate 32 and allow ball 41 to make rolling engagement with the piezoelectric and insulative films. This is especially useful in applications in which the ball can have a relatively large diameter and the films can be relatively thick to limit peak unit pressures within the piezoelectric film to safe levels. In such applications, the ball can be flexibly retained by cages attached to the platen or extensions thereof.

The platen is held on the base by a magnetic retainer comprising a permanent magnet 49 mounted on the base and a magnetic material 51 mounted on the under side of the platen above the magnet. The force of the magnet draws the platen in a downward direction into engagement with the balls on the base.

Alternatively, the platen can be held down by a helical or spiral spring which is attached to a boss protruding from the bottom of the platen near its center, extends through an opening in the base and is connected to a bridge member that bears against the lower side of the base. A circuit board is conveniently mounted beneath the base, in which case the retaining spring can pass through the board and be attached to a bridge member which bears against the board to retain it in place.

As illustrated in FIG. 4, the outputs of y-direction transducers 26 and 27 are combined in an adder 53 to provide a signal E(y) which represents the net force applied to the platen in the y-direction. This signal and the signal E(x) from transducer 24 are combined in a divider 54 to provide an output signal corresponding to the slope of the forces. This signal and the E(x) and E(y) signals are processed in a known manner to analyze the handwriting or verify the signature on the platen.

Operation and use of the system, and therein the method of the invention, are as follows. A person whose handwriting is to be analyzed or whose signature is to be verified writes upon the upper surface of the platen with a suitable instrument such as a plastic stylus. As he moves the stylus, the x and y components of the frictional forces exerted on the platen by the stylus in a direction parallel to the writing surface are applied to the transducers through the balls 41. The piezoelectric film produces electrical signals corresponding to the respective magnitudes of these forces, and these signals are processed to analyze the handwriting or verify the signature.

The transducers are preloaded by spring clips 47, and the balls provide a stiff coupling between the platen and each of the transducers in the direction in which the measurement is to be made by that transducer. At the same time, since the balls are free to roll between the surfaces of the bosses and the pressure plates, a compliant coupling is provided between the platen and each of the transducers in a direction perpendicular to the axis of the transducer. Similarly, the balls which mount the platen on the base provide a compliant coupling in a direction parallel to the surface of the platen (the x-y plane) and a stiff coupling in a direction perpendicular to the surface (the z-direction).

The balls transfer forces acting in the direction perpendicular to the piezoelectric film in the transducers associated therewith with full fidelity and permit substantially unrestrained relative movement of the platen and the transducers in directions parallel to the film. The movement in the parallel directions is of very small magnitude, i.e. the order of microinches of deflection, but the decoupling is very important to the accurate functioning of the device.

In the embodiment of FIG. 6, a platen 56 with a writing surface 57 is mounted on a base 58 for movement in a plane parallel to the writing surface. In this embodiment, the platen is supported on the base by flexure means consisting of a plurality of upstanding flexure elements 59 which are rigid in the vertical direction and compliant in horizontal directions. The platen rests on the flexure elements which are placed in compression by the weight of the platen and downwardly directed forces applied to the platen.

The flexure elements can be of any suitable design, and in one presently preferred embodiment, they are chemically milled from flat metal stock, although they could also be formed by die punching or by any other suitable means. In the particular embodiment illustrated, the flexure elements are arranged in pairs, with two parallel, spaced apart relatively slender rod-like elements in each pair. However, they can be of any suitable form and number, including individual rods or wires, as long as they are relatively rigid in the longitudinal direction and relatively compliant in lateral directions.

In the embodiment illustrated, the flexure elements are received in slots 60 in the surfaces of the base and the platen, and affixed in position by suitable means such as epoxy or brazing. The slots are made oversize to facilitate accurate vertical alignment of the flexure elements during assembly, which is important in assuring that the load of the platen and other vertical forces will be applied directly down the axes of the elements and not produce a side loading which could cause the elements to buckle. While the elements do deflect laterally when handwriting forces are applied to the platen, this deflection is not large enough to cause the elements to buckle.

Transducers 61–63 are mounted on the base for monitoring the x- and y-components of the forces applied to the writing surface of the platen, with transducer 61 monitoring the x-component and transducers 62 and 63 monitoring the y-components. The outputs of the two y-component transducers are combined in the manner discussed above in connection with the embodiment of FIG. 2 to provide a single y-component signal.

Each of the transducers has a block 64 affixed to the base, a pressure plate 66, and a film of piezoelectric material 67 positioned between the pressure plate and the block for providing an electrical signal corresponding to the force exerted upon the film by the pressure plate.

The x- and y-components of forces produced by handwriting on the surface of the platen are applied to the respective transducers by flexure means consisting of flexure elements 68–70 connected between the transducers and bosses 72–74 on the underside of the platen. Flexure element 68 extends in the x-direction and is relatively rigid in that direction, and elements 69–70 extend in the y-direction and are relatively rigid in that direction. Each of these elements is relatively compliant in a direction perpendicular to its length.

In the embodiment illustrated, the flexure elements which couple the platen to the transducers are similar to the flexures which support the platen on the base, but they can be of any other suitable design, including rods, wires, and flexure plates. If plates are used, they should be oriented to provide rigidity in the desired x- or y-direction and compliance in the other direction. A flexure plate connected to the x-transducer would, for example, be disposed in a vertical plane extending in the x-direction. Although the flexures are shown in pairs, they can be used in any suitable number, including individual elements, if desired.

The flexure elements are received in slots 76 in the pressure plates and bosses and are affixed in position by suitable means such as epoxy or brazing. The slots are oversize to permit accurate alignment of the flexure elements parallel to the writing surface of the platen and to the x- and y-axes during assembly.

As illustrated in FIG. 7, preloading clamps 77 are mounted on transducers 61–63. For ease of illustration, these clamps are not shown in FIG. 6, but they are employed for all three transducers. The clamps apply a preloading pressure to the transducers which causes a certain polarization within the piezoelectric film. If the pressure is increased, the polarization is also increased, and a positive voltage is induced. If the pressure is decreased, the polarization is also decreased, and a negative voltage is induced.

If desired, the positions of the bosses and the transducers can be reversed, with the transducers being mounted on the under side of the platen and the bosses being affixed to the base.

Operation and use of the embodiment of FIG. 6 is similar to that of FIG. 2, with the flexure elements providing a stiff coupling between the platen and the transducers in the desired directions and a compliant coupling in other directions.

The invention has a number of important features and advantages. Although it has been disclosed with specific reference to the analysis of handwriting and the verification of signatures, it can also be utilized in a variety of other applications such as proportional control and as a general input device for computers.

It is apparent from the foregoing that a new and improved force resolving system and method have been provided. While only certain presently preferred embodiments have been described in detail, as will be apparent to those familiar with the art, certain changes and modifications can be made without departing from the scope of the invention as defined by the following claims.

I claim:

1. In a system for monitoring forces which act on the surface of a platen and have components directed along first and second mutually perpendicular axes in a plane parallel to the surface of the platen: first and second transducers for producing signals corresponding to forces applied thereto, flexure means coupling the platen to the first transducer for transmitting the component of the forces along the first axis to the first transducer and permitting movement of the platen in a direction parallel to the second axis, and flexure means coupling the platen to the second transducer for transmitting the component of the forces along the second axis to the second transducer and permitting movement of the platen in a direction parallel to the first axis.

2. The system of claim 1 including means for combining the signals from the transducers to provide an output signal corresponding to the combined forces acting on the platen in the first and second directions.

3. The system of claim 1 wherein each of the flexure means comprises an element having longitudinal rigidity and lateral compliance, said element being placed in longitudinal compression by the component of force transmitted by the flexure means.

4. The system of claim 1 including a base, and means mounting the platen on the base permitting movement of the platen relative to the base in directions parallel to the first and second axes but not in a direction perpendicular to the axes.

5. The system of claim 4 wherein the means mounting the platen on the base comprises a flexure element having longitudinal rigidity and lateral compliance, said element being aligned longitudinally with the direction perpendicular to the axes.

6. The system of claim 1 including a third transducer, means coupling the platen to the third transducer for transmitting the component of the forces along the second axis to the third transducer and permitting movement of the platen in a direction parallel to the first axis, and means for combining the signal from the third transducer with the signals from the first and second transducers to provide the output signal.

7. The system of claim 6 wherein the means for combining the signal from the third transducer with the signals from the first and second transducers includes means for combining the signals from the second and third transducers to provide a signal representative of the net force transmitted along the second axis, and means for combining the net force signal with the signal from the first transducer.

8. The system of claim 1 wherein each of the transducers comprises a pressure plate and means for producing a signal corresponding to the force applied to the pressure plate, the component of forces transmitted by the flexure means being applied to the pressure plate in a direction substantially perpendicular to the pressure plate.

9. The system of claim 8 wherein each of the transducers includes a piezoelectric film which is compressed by the forces applied to the pressure plate and produces an electrical signal corresponding to said forces.

10. In a system for monitoring forces acting on a platen: a block mounted in a fixed position, a pressure plate, a film of piezoelectric material positioned between the pressure plate and the block for producing an electrical signal corresponding to a force applied to the pressure plate, a boss affixed to the platen in facing relationship with the pressure plate, and a flexure element having longitudinal rigidity and lateral compliance positioned between the boss and the pressure plate for transferring forces from the platen to the pressure plate.

11. The system of claim 10 wherein the forces transferred from the platen to the pressure plate are applied compressively to the flexure element.

12. In a system for analyzing handwriting: a base, a platen mounted on the base and having a writing surface, first and second transducers mounted on the base for producing signals corresponding to forces applied thereto, means including a flexure element connected between the platen and the first transducer for applying forces acting in a first direction on the writing surface to the first transducer, means including a flexure element connected between the platen and the second transducer for applying forces acting in a second direction on the writing surface to the second transducer, said first and second directions being generally perpendicular to each other and parallel to the writing surface, and means responsive to the signals from the transducers for providing an output signal corresponding to the handwriting.

13. The system of claim 12 including means mounting the platen on the base permitting movement of the platen on the base in directions parallel to the first and second directions but not in a direction perpendicular to the first and second directions.

14. In a method of analyzing handwriting utilizing a platen having a writing surface on which forces are exerted by the handwriting, the steps of: applying forces acting in a first direction on the writing surface to a first transducer through a flexure element connected between the platen and the first transducer, applying forces acting in a second direction on the writing surface to a second transducer through a flexure element connected between the platen and the second transducer, said first and second directions being generally perpendicular to each other and parallel to the writing surface, and processing signals from the transducers to provide an output signal corresponding to the handwriting.

15. In a system for analyzing handwriting: a base member, a platen member having a writing surface, first and second transducers mounted on one of the base and platen members for producing signals corresponding to forces applied thereto, first and second bosses affixed to the other of the base and platen members, a first flexure element having rigidity in a first axial direction connected between the first boss and the first transducer for applying to the first transducer a component of force produced in the first axial direction by handwriting on the surface, a second flexure element having rigidity in a second axial direction connected between the second boss and the second transducer for applying to the second transducer a component of force produced in the second axial direction by handwriting on the surface, said first and second flexure elements being compliant in directions other than the first and second axial directions respectively, and means responsive to the signals from the transducers for providing an output signal corresponding to the handwriting.

16. The system of claim 15 wherein the flexure elements comprise rods having longitudinal rigidity and lateral compliance.

17. The system of claim 15 wherein the transducers have films of piezoelectric material and pressure plates for applying forces from the flexure elements to the piezoelectric material.

* * * * *